United States Patent [19]

Bier et al.

[11] Patent Number: 4,728,685
[45] Date of Patent: Mar. 1, 1988

[54] RAPID-CRYSTALLIZING POLYPHENYLENE SULPHIDE COMPOSITIONS

[75] Inventors: Peter Bier, Pittsburgh, Pa.; Klaus Reinking, Wermelskirchen, Fed. Rep. of Germany; Ludwig Bottenbruch; Erhard Tresper, both of Krefeld, Fed. Rep. of Germany

[73] Assignee: Bayer Aktiengesellschaft, Leverkusen, Fed. Rep. of Germany

[21] Appl. No.: 19,017

[22] Filed: Feb. 26, 1987

[30] Foreign Application Priority Data

Mar. 8, 1986 [DE] Fed. Rep. of Germany ....... 3607713

[51] Int. Cl.$^4$ .............................................. C08K 5/36
[52] U.S. Cl. .................................... 524/303; 524/368; 264/331.11
[58] Field of Search ............... 524/303, 304, 305, 368, 524/381, 609; 525/537; 428/419; 528/388; 264/331.11

[56] References Cited

U.S. PATENT DOCUMENTS

| | | | |
|---|---|---|---|
| 2,645,659 | 7/1953 | Morris et al. | 524/368 |
| 2,995,539 | 8/1961 | Barker et al. | 524/368 |
| 3,070,584 | 12/1962 | Brachel et al. | 524/368 |
| 3,087,899 | 4/1963 | Esser et al. | 524/368 |
| 3,168,620 | 12/1964 | Brachel et al. | 524/368 |

FOREIGN PATENT DOCUMENTS 61-130354  6/1986  Japan ................................ 524/303

*Primary Examiner*—Veronica P. Hoke
*Attorney, Agent, or Firm*—Connolly & Hutz

[57] ABSTRACT

The invention relates to highly crystalline, rapid-crystallizing, thermoplastic compositions of polyphenylene sulphides and thioethers.

3 Claims, No Drawings

RAPID-CRYSTALLIZING POLYPHENYLENE SULPHIDE COMPOSITIONS

The invention relates to highly crystalline, rapid-crystallizing, thermoplastic compositions of polyphenylene sulphides and thioethers.

Polyphenylene sulphides can be used as raw materials for preparing fibres, sheets and shaped articles. Owing to their partly crystalline structure, they have excellent properties, for example high wear resistance, favourable creep resistance properties and high dimensional accuracy. They are therefore highly suitable for the production of mechanically and thermally highly stressed parts.

An additional improvement in the mechanical properties can be obtained, for example, by incorporating reinforcing materials such as glass fibres.

However, the production of shaped articles from polyphenylene sulphide by injection moulding is problematical since high mould temperatures (>130° C.) and relatively long moulding times are necessary. Most injection moulding processors cannot use mould temperatures of 130° C. and more since the moulds are normally designed for a temperature around 100° C. (heating agent water). Mould installations which are operated with other heating agents, for example oil, and attain temperatures >110° C. are generally rare, and their use poses problems. Very frequently even they in practice do not attain the desired temperatures, and the temperature distribution is uneven. Owing to these disadvantages, it can be economically unrecommendable to use such high mould temperatures in the injection moulding sector.

Furthermore, it is desirable to attain high crystallinity as rapidly as possible in order to obtain optimal properties. High crystallinity ensures hardness, dimensional stability, and shape stability, even at relatively high temperatures. Also dependent on the mould residence time is the length of the injection moulding cycle which codetermines the economics.

These cycles are relatively long even at the high mould temperatures for the processing of polyphenylene sulphide and hinder the advance of polyphenylene sulphide in the production of injection mouldings.

It has now been found that polyphenylene sulphides have higher crystallinity and crystallize more rapidly when they contain 0.5-30% by weight, relative to polyphenylene sulphide, of thioether. This allows the degree of crystallinity required for high shape stability to be reached more rapidly and the polyphenylene sulphide compositions thus to be processed in much shorter injection cycles.

A further advantage of the polyphenylene sulphide composition according to the invention consists in the reduction of the mould temperature without the advantageous crystallization properties being impaired. The injection moulding composition cools down more rapidly, thus further reducing the mould resistance time.

The invention relates to highly crystalline, rapid-crystallizing thermoplastic compositions consisting of:

(a) 7-95.5, preferably 90-98.5, particularly preferably 93-97, % by weight of a polyphenylene sulphide having a melt viscosity of at least 5 Pas, preferably of at least 50 Pas to 1200 Pas (measured at 306° C. under a shearing stress of $10^3$ Pa) and (b) 0.5-30, preferably 1.5-10, particularly preferably 3-7, % by weight, relative to (a) and (b), of a thioether.

The present invention further relates to a process for preparing highly crystalline, rapid-crystallising, thermoplastic compositions, which is characterized in that 70-99.5, preferably 90-98.5, particularly preferably 93-97, % by weight of polyphenylene sulphide having a melt viscosity of at least 5 Pas, preferably of at least 50 Pas to 1200 Pas (306° C., $10^3$ Pa) and 0.5-30, preferably 1.5-10, particularly preferably 3 to 7, % by weight of a thioether are mixed by adding the thioether to the polyphenylene sulphide melt and homogenizing the mixture in the melt.

The polyphenylene sulphide compositions according to the invention are thermoplastically processible and can be used for injection moulding. In injection-moulding processing, a mixture of a polyphenylene sulphide having a melt viscosity of at least 5 Pas, preferably of at least 50 Pas to 1200 Pas (measured at 306° C. under a shearing stress of $10^3$ Pa) and a thioether can be cast into moulds which have a temperature of no more than 120° C., the amount of thioether being chosen in such a way that the injection-moulded polyphenylene sulphide has at least 70% of the crystallinity which is obtained when injection moulding a moulding from unmodified polyphenylene sulphide at mould temperatures of at least 130° C. A suitable measure of crystallinity is for example the heat of fusion as determinable with a TLC apparatus.

Polyarylene sulphides can be prepared in a known manner from dihalogenoaromatics and alkali metal sulphides in solution (for example U.S. Pat. No. 2,513,188).

For the purposes of the present invention, thioethers are to be understood as meaning compounds which contain one or more —S— groups. A list of such products and their methods of preparation can be found for example in Dr. Kurt Thinius; Chemie, Physik und Technologie der Weichmacher [Chemistry, Physics and Technology of Plasticizers], VEB Verlag Technik, Berlin 1960 on pages 482 to 502.

Thioethers usable according to the invention are compounds of thioglycolic acid and/or thiodiglycol of the formulae (I) and (II):

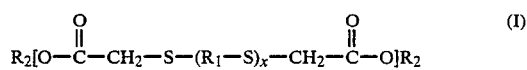

in which
R$_1$ represents a divalent C$_1$-C$_{10}$-aliphatic, C$_5$-C$_{12}$-cycloaliphatic, C$_7$-C$_{24}$-araliphatic or C$_6$-C$_{24}$-aromatic radical, R$_2$ represents identical or different C$_1$-C$_{10}$-alkyl, C$_5$-C$_{12}$-cycloalkyl, C$_7$-C$_{12}$-aralkyl, C$_6$-C$_{24}$-aryl radicals which are substantially inert towards polyphenylene sulphide under injection moulding conditions, x represents the number 0 or 1 and y represents a whole number from 1 to 50.

Examples of the thioethers according to the invention are: butyl methylenebisthioglycolate, di-2-ethylhexyl thiodiglycolate, ethoxylated thiodiglycol and polythiodiglycol.

The preparation of the mixture of polyphenylene sulphides and thioethers can be carried out on commercially customary mixing apparatuses. Suitable such apparatuses are kneaders and single-screw and twin-screw extruders. For further processing, the mixture obtained can be granulated after the melt has solidified.

The polyphenylene sulphide compositions can additionally contain fillers and/or reinforcing materials in the form of powders, fibres or mats. Examples thereof are metals such as steel, copper, aluminium or carbon. Preferred fillers are quartz, talcum or kaolin, preferred reinforcing materials are glass fibres.

The compositions can optionally further contain inorganic pigments, such as, for example $TiO_2$, ZnS, phthalocyanine, carbon black, Cd pigments, spinels or organic dyestuffs, flow aids, mould release agents, UV absorbers and/or stabilizers.

To further increase the flame resistance of the products, they can additionally contain customary flame-retarding additives such as, for example, those which contain halogen, phosphorus, phosphorus nitride, optionally in combination with oxides of the elements of subgroup V such as, for example, antimony oxide.

The rate of crystallization of the polyphenylene sulphide compositions can be further increased by adding inorganic or organic nucleating agents. This is carried in the usual way with injection moulding compositions. The amounts are 0.05 to 5, preferably 0.1 and 1% by weight. The preferred nucleating agent is microtalcum.

The polyphenylene sulphide compositions according to the invention are excellent starting materials for preparing sheets and fibres, preferably for preparing shaped articles of any kind by injection moulding.

EXAMPLES

The polyphenylene sulphide compositions according to the invention were prepared by mixing and homogenizing the base components (see Table 1) with a 30 mm Werner and Pfleiderer twin-screw extruder at a melt temperature of 310° C. The extrudates, chopped into granules, were dried overnight.

The isothermal rate of crystallization of the dried granules was measured by means of a TLC apparatus. Pretreatment of the samples: heated to 330° C., maintained at this temperature for 1 min and quenched in liquid nitrogen. The amorphous samples were allowed to crystallize out isothermally at 110° C. in the TLC apparatus, the change in the heat of crystallization being recorded as a function of time (exothermic peak).

As a measure of the rate of crystallization, the time required to reach the maximum is recorded in Table 1 as a half-value time.

The samples 1–4 according to the invention listed in Table 1 consist of a polyphenylene sulphide having a melt viscosity of 108 Pas (measured up to 306° C. and a shearing stress of 1000 Pa), 3.5% by weight of a thioether, 40% by weight of glass fibres and 5% by weight of microtalcum. Example 5 is a corresponding polyphenylene sulphide without thioether, for comparison.

TABLE 1

| Example | Thioether | Isothermal (110° C.) rate of crystallization half-value time [s] |
|---|---|---|
| 1 | Butyl methylenebisthioglycolate<br><br>$H_2C\begin{cases} S-CH_2-\overset{O}{\underset{\|}{C}}O-C_4H_9 \\ S-CH_2-\overset{O}{\underset{\|}{C}}O-C_4H_9 \end{cases}$ | 16 |
| 2 | Di-2-ethylhexyl thiodiglycolate<br><br>$S\begin{cases} CH_2-\overset{O}{\underset{\|}{C}}O-C_8H_{17} \\ CH_2-\overset{O}{\underset{\|}{C}}O-C_8H_{17} \end{cases}$ | 15 |
| 3 | Ethoxylated thiodiglycol with butyl and 1-octyl end groups<br><br>$S\begin{cases} CH_2-CH_2-OCH_2-\overset{C_2H_5}{\underset{\|}{C}H}-CH_2-CH_2-CH_2-CH_3 \\ CH_2-CH_2-O(CH_2-CH_2-O)_n-C_4H_9 \end{cases}$<br>n = 2–8 | 12 |
| 4 | Ethoxylated thiodiglycol with butyl end groups<br>$C_4H_9-(OCH_2CH_2)_n-OC_2H_4-S-C_2H_4-O-(CH_2CH_2O)_n-C_4H_9$<br>n = 1–4 | 5 |
| 5 | — | 43 |

We claim:

1. A highly crystalline, rapid-crystallizing, thermoplastic composition comprising
   (a) 70–99.5% by weight of a polyphenylene sulphide having a melt viscosity of at least 5 Pas, measured at 306° C. under a shearing stress of $10^3$ Pa, and
   (b) 0.5–30% by weight, relative to (a) and (b), of a thioether selected from

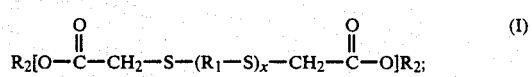

-continued $$R_2[O-CH_2CH_2-(S-CH_2CH_2)_y O]R_2 \quad (II)$$

or mixtures thereof
where
R$_1$ represents a divalent C$_1$–C$_{10}$-aliphatic, C$_5$–C$_{12}$-cycloaliphatic, C$_7$–C$_{24}$-araliphatic or C$_6$–C$_{24}$-aromatic radical,
R$_2$ represents identical or different C$_1$–C$_{10}$-alkyl, C$_5$–C$_{12}$-cycloalkyl, C$_7$–C$_{12}$-aralkyl,
C$_6$–C$_{24}$-aryl radicals which are substantially inert towards polyphenylene sulphide under injection moulding conditions,
x represents the number 0 or 1 and
y represents a whole number from 1 to 50.

2. A process for preparing a highly crystalline, rapid-crystallizing, composition thermoplastic characterized in that 70–99.5% by weight of a polyphenylene sulphide having a melt viscosity of at least 5 Pas, measured at 306° C. under a shearing stress of 10$^3$ Pa, and 0.5–30% by weight of a thioether are mixed by adding the thioether to the polyphenylene sulphide melt and homogenizing the mixture in the melt and where the thioether is selected from $$R_2[O-\overset{O}{\underset{\|}{C}}-CH_2-S-(R_1-S)_x-CH_2-\overset{O}{\underset{\|}{C}}-O]R_2; \quad (I)$$

$$R_2[O-CH_2CH_2-(S-CH_2CH_2)_y O]R_2 \quad (II)$$

or mixtures thereof
where
R$_1$ represents a divalent C$_1$–C$_{10}$-aliphatic, C$_5$–C$_{12}$-cycloaliphatic, C$_7$–C$_{24}$-araliphatic or C$_6$–C$_{24}$-aromatic radical,
R$_2$ represents identical or different C$_1$–C$_{10}$-alkyl, C$_5$–C$_{12}$-cycloalkyl, C$_7$–C$_{12}$-aralkyl,
C$_6$–C$_{24}$-aryl radicals which are substantially inert towards polyphenylene sulphide under injection moulding conditions,
x represents the number 0 or 1 and
y represents a whole number from 1 to 50.

3. A method of making a molded article comprising casting a mixture of a polyphenylene sulphide having a melt viscosity of at least 5 Pas, measured at 306° C. under a shearing stress of 10$^3$ Pa, and a thioether into a mould which has a temperature of not more than 120° C., the amount of thioether being chosen in such a way that the injection-moulded polyphenylene sulphide has at least 70% of the crystallinity which is obtained on injection moulding a moulding from unmodified polyphenylene sulphide at mould temperatures of at least 130° C., where the thioether is selected from $$R_2[O-\overset{O}{\underset{\|}{C}}-CH_2-S-(R_1-S)_x-CH_2-\overset{O}{\underset{\|}{C}}-O]R_2; \quad (I)$$

$$R_2[O-CH_2CH_2-(S-CH_2CH_2)_y O]R_2 \quad (II)$$

or mixtures thereof
where
R$_1$ represents a divalent C$_1$–C$_{10}$-aliphatic, C$_5$–C$_{12}$-cycloaliphatic, C$_7$–C$_{24}$-araliphatic or C$_6$–C$_{24}$-aromatic radical,
R$_2$ represents identical or different C$_1$–C$_{10}$-alkyl, C$_5$–C$_{12}$-cycloalkyl, C$_7$–C$_{12}$-aralkyl,
C$_6$–C$_{24}$-aryl radicals which are substantially inert towards polyphenylene sulphide under injection moulding conditions,
x represents the number 0 or 1 and
y represents a whole number from 1 to 50.

* * * * *